Figure 1:
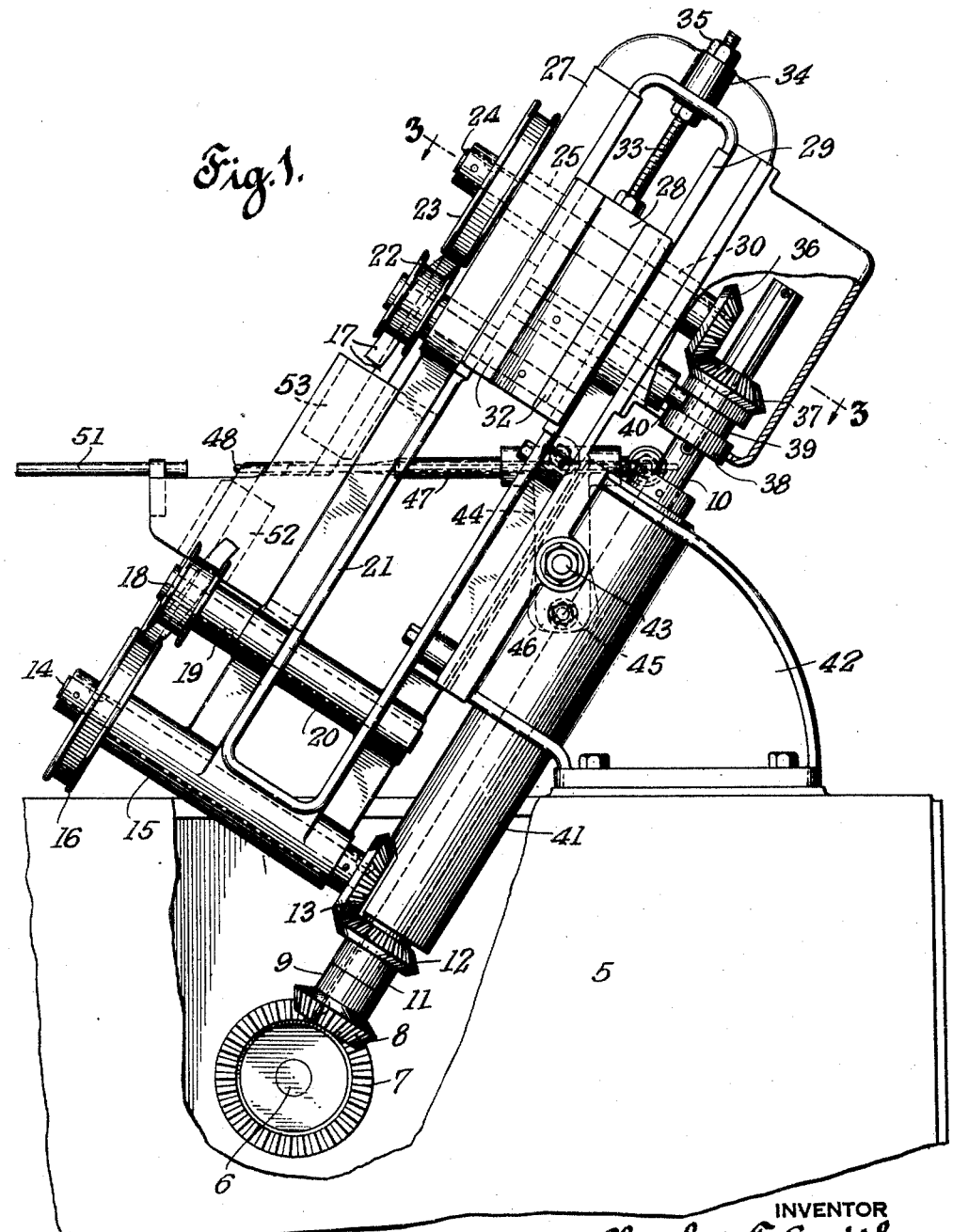

March 31, 1931.  C. F. SMITH  1,798,909

MACHINE FOR MAKING SPIRALLY WOUND TUBES

Filed Nov. 30, 1928  2 Sheets-Sheet 1

INVENTOR
Charles F. Smith
BY Wilbur M. Stone
his ATTORNEY

March 31, 1931. C. F. SMITH 1,798,909
MACHINE FOR MAKING SPIRALLY WOUND TUBES
Filed Nov. 30, 1928 2 Sheets-Sheet 2
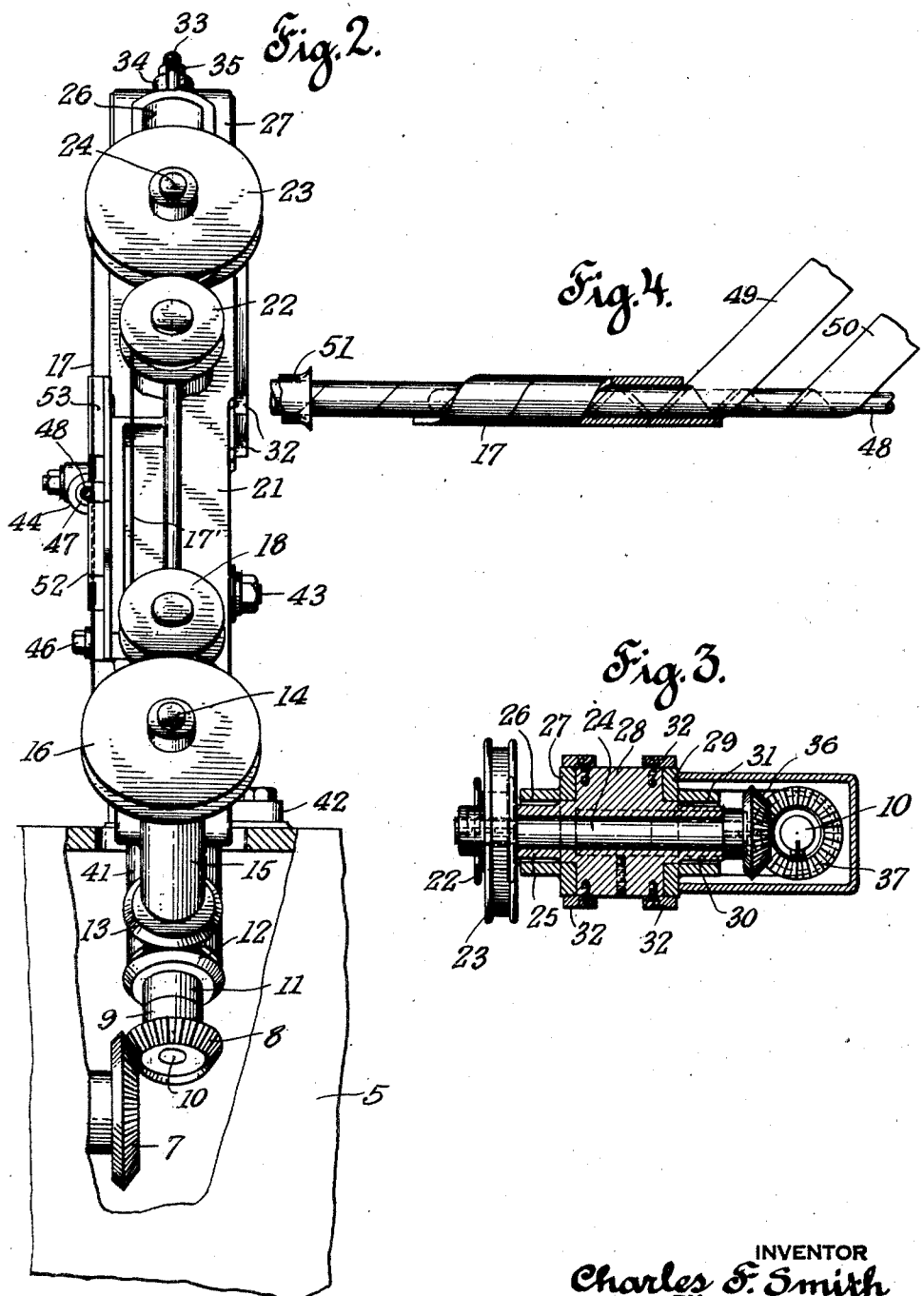
INVENTOR
Charles F. Smith
BY Wilbur M. Stone
his ATTORNEY Patented Mar. 31, 1931

1,798,909

UNITED STATES PATENT OFFICE

CHARLES F. SMITH, OF BROOKLYN, NEW YORK, ASSIGNOR, BY MESNE ASSIGNMENTS, TO LILY-TULIP CUP CORPORATION, OF NEW YORK, N. Y., A CORPORATION OF DELAWARE

MACHINE FOR MAKING SPIRALLY-WOUND TUBES

Application filed November 30, 1928. Serial No. 322,782.

This invention relates to machines for making spirally-wound tubes, and has for an object the provision of means for adjusting the tension of the winding belt used in such machines.

With this and other objects in view, which will appear later herein, my improvements comprise features illustrated in one embodiment thereof and which may be the preferred embodiment, in the drawings which accompany this specification, wherein:

Figure 1 is a plan view of a machine for making spirally wound tubes, embodying my improvements. Fig. 2 is an elevation of that which is shown in Fig. 1. Fig. 3 is a sectional view taken on the line 3—3 of Fig. 1. Fig. 4 is a fragmentary plan view of a mandrel and guide upon which the spirally wound tubing is formed. The scale of Figs. 1, 2 and 3 is equal, while the scale of Fig. 4 is about four times that of the earlier figures.

Directing attention now to the drawings, journalled in the walls of base 5 of the machine is shaft 6, which has fixed thereon bevel gear 7, the shaft 6 being driven by power from a convenient source not shown. Meshing with gear 7, is bevel gear 8 having an integral spacing collar 9, keyed to shaft 10. Hub 9 cooperates with a similar hub 11, keyed to shaft 10 and integral with bevel gear 12, to maintain the relative positions of gears 8 and 12.

Gear 12 engages bevel gear 13 fixed to shaft 14, the latter being journalled in bearing 15. Also fixed to shaft 14 is flanged pulley 16 upon which is carried belt 17. The belt 17 passes over flanged guide roll 18, which is mounted on shaft 19 journalled in bearing 20, the latter being formed upon the bracket 21.

A similar guide roll 22 also guides the belt onto pulley 23, which is fixed to shaft 24, journalled in bearing 25, the latter being slidable in longitudinal slot 26 in the frame member 27, Figs. 1 and 3.

The bearing 25 is integral with a flanged block 28 slidable on and between frame members 27 and 29, Fig. 3, and is also provided with a second bearing 30 for shaft 24, the bearing 30 being slidable in longitudinal slot 31 in frame member 29.

Attached to the block 28 by screws or other suitable means are overhanging bearing plates 32, which slidably engage the upper and lower edges of frame members 27 and 29.

Fixed to block 28 is threaded bolt 33 which passes through an apertured boss 34 on the end of the frame. By rotating nut 35, which threadedly engages the bolt and bears against boss 34, the bolt may be moved longitudinally through the boss, causing block 28 to slide upon frame members 27 and 29.

Fixed to shaft 24 is bevel gear 36 which engages bevel gear 37 having an integral hub 38 keyed to shaft 10. The hub 38 is provided with a circumferential groove 39 in which rides pin 40, the latter being fixed to block 28 to move therewith.

The shaft 10 is journalled in bearing 41, which is mounted on support 42 fixed to main casing 5.

Pivoted at 43 to support 42 is arm 44 having one end provided with slot 45 which cooperates with clamping bolt and nut arrangement 46 to hold the arm in adjusted angular positions. The other end of arm 44 has mounted thereon mandrel 47 having pin 48 about which the strips of paper are wound to form the tubes.

Referring to Fig. 4, it will be seen that two strips 49, 50 of paper are fed to pin 48 from reels (not shown) forming a part of the machine. The belt 17 is wound several times around the pin, and as the belt moves it grips the paper strips and winds them spirally to form a tube which is fed into hollow guide 51. It will be noted that pulley 16 is considerably offset from the frame relative to pulley 23, this being necessary on account of the shifting of the path of the belt 17 due to the windings about pin 48. In order to compensate for this shifting of the path of the belt, the slack side 17' of the belt is passed over guide rolls 18 and 22, the roll 18 being offset inwardly from pulley 16 towards the frame, while roll 22 is offset outwardly from pulley 23, as clearly shown in Fig. 1.

The adjustable mounting above described for arm 44 enables the pin 48 to be properly positioned directly in line with the longitudinal axis of the hollow guide 51, so that tubes formed upon the pin will readily enter guide 51.

When it is desired to tighten or loosen belt 17, block 28 is slid along frame members 27 and 29 until the proper tension of the belt is obtained. It will be noted that guide roll 22 and pulley 23 move with block 28, as likewise does pin 40, which bears against one side of groove 39 in collar 38 to maintain the engagement between gears 36 and 37 during the movement of block 28.

The foregoing disclosure is to be regarded as descriptive and illustrative only, and not as restrictive or limitative of the invention, of which obviously an embodiment may be constructed including many modifications without departing from the general scope herein indicated and denoted in the appended claims.

Having thus described my invention, what I claim as new and desire to secure by Letters Patent is:

1. In a machine of the class described, a frame, a block slidably mounted on the frame, a shaft journalled in the block, pulley fixed to one end of the shaft, a bevel gear fixed to the other end of the shaft, a drive shaft positioned at right angles to the first mentioned shaft, a bevel gear keyed to said drive shaft for sliding movement and engaging the first mentioned bevel gear, a collar integral with said bevel gear, said collar having a circumferential groove, and a pin fixed to the block and riding in the groove to maintain the bevel gears in engagement during the movement of the block.

2. In a machine of the character described, a pair of pulleys, a belt passing over said pulleys, a pin one side of the belt being wound several times around the pin, a frame upon which the pulleys are rotatably mounted, one of said pulleys being offset at a greater distance from the frame than the other pulley, guide rolls for the other side of the belt, one of the rolls being offset inwardly from the outermost pulley and the other guide roll being offset outwardly from the innermost pulley to compensate for the shifting of the path of the belt due to the windings about the pin.

In witness whereof, I hereby affix my signature this 27th day of November, 1928.

CHARLES F. SMITH.